United States Patent
Ryun et al.

(10) Patent No.: US 9,718,198 B2
(45) Date of Patent: Aug. 1, 2017

(54) STRIPPING TOOL FOR LEAFY VEGETABLES AND HERBS

(71) Applicant: Chef'n Corporation, Seattle, WA (US)

(72) Inventors: Janet Ryun, Seattle, WA (US); Adam A. Jossem, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 14/847,919

(22) Filed: Sep. 8, 2015

(65) Prior Publication Data

US 2016/0129600 A1    May 12, 2016

Related U.S. Application Data

(60) Provisional application No. 62/047,493, filed on Sep. 8, 2014.

(51) Int. Cl.
*B26B 11/00* (2006.01)
*A47J 43/28* (2006.01)
*A47J 17/00* (2006.01)

(52) U.S. Cl.
CPC ............... *B26B 11/00* (2013.01); *A47J 17/00* (2013.01)

(58) Field of Classification Search
CPC .......... A47J 11/00; A47J 43/288; A47J 17/00; B26B 11/00
USPC .......................... 30/123, 351, 356; 47/1.01 R
See application file for complete search history.

(56) References Cited

U.S. PATENT DOCUMENTS

| | | | | |
|---|---|---|---|---|
| 1,455,621 A | * | 5/1923 | Joyner | A61B 17/14 30/166.3 |
| D270,655 S | * | 9/1983 | Collins | D22/118 |
| 4,546,510 A | * | 10/1985 | Harrison | B26B 23/00 30/151 |
| 4,817,221 A | * | 4/1989 | Ryan | B25F 1/02 30/123.7 |
| 5,044,115 A | * | 9/1991 | Richardson | A01G 5/00 144/24.13 |
| D330,665 S | * | 11/1992 | Neuendorf | D7/693 |
| 5,401,208 A | * | 3/1995 | Marvin | A47G 21/065 30/120.1 |
| 5,468,247 A | * | 11/1995 | Matthai | A61B 17/14 30/339 |
| 5,561,904 A | * | 10/1996 | Chung | A01G 5/00 30/234 |

(Continued)

*Primary Examiner* — Hwei C Payer
(74) *Attorney, Agent, or Firm* — Seed Intellectual Property Law Group LLP

(57) ABSTRACT

Devices and methods for use in removing the foliage from stems of leafy vegetables and sprigs of herbs are shown and described. The device has a body that is sized and shaped to fit comfortably into a one hand. The body can be generally flat and can have at least one edge following a convex curve. A trimming blade projects outwardly from at least a portion of the convexly curved edge of the body. A selection of apertures of different sizes extends through the body. The user can select an aperture large enough to allow the stem to pass through, but too small for the foliage to pass through. During use, a user can use the trimming blade to trim off unwanted parts from a sprig of herb or a piece of leafy vegetable, pass the sprig through a selected aperture sized to remove the foliage therefrom, and cut the foliage to the desired size by rocking the trimming blade along its length over the foliage.

5 Claims, 4 Drawing Sheets

(56) References Cited

U.S. PATENT DOCUMENTS

| | | | | |
|---|---|---|---|---|
| 5,581,895 | A | * | 12/1996 | Jeffcoat .................... B26B 1/02 30/294 |
| D397,001 | S | * | 8/1998 | Antista .......................... D7/694 |
| D403,204 | S | * | 12/1998 | Kwok ......................... D7/401.2 |
| 5,899,019 | A | * | 5/1999 | Groves ..................... A01G 5/00 47/1.01 R |
| D459,166 | S | * | 6/2002 | Harrison, Jr. ................... D7/701 |
| 6,671,967 | B1 | * | 1/2004 | Huang ................. A01G 3/0251 30/254 |
| D600,506 | S | * | 9/2009 | Miltner .......................... D7/649 |
| D607,298 | S | * | 1/2010 | Lucas .............................. D8/98 |
| D646,130 | S | * | 10/2011 | Mayer ................................ D8/1 |
| 8,074,361 | B2 | * | 12/2011 | Bohlman ................. A01G 3/02 30/123 |
| D662,787 | S | * | 7/2012 | Holmes ....................... D7/401.2 |
| 8,707,490 | B1 | * | 4/2014 | Pelton ...................... B26B 1/00 30/123 |
| 9,126,324 | B2 | * | 9/2015 | Hunkele ................... B26B 3/03 |
| D753,966 | S | * | 4/2016 | Holding ........................ D7/693 |
| 2016/0129600 | A1 | * | 5/2016 | Ryun ..................... A47J 17/00 30/123 |

* cited by examiner

STRIPPING TOOL FOR LEAFY VEGETABLES AND HERBS

RELATED APPLICATION

This application claims priority to U.S. provisional patent application Ser. No. 62/047,493 filed on Sep. 8, 2014, the entire contents of which is herein incorporated by reference.

BACKGROUND OF THE INVENTION

Field of the Invention

The present disclosure generally is related to kitchen tools, and more particularly, to tools for use stripping the foliage from the stalk on leafy vegetables and herbs.

BRIEF SUMMARY OF THE INVENTION

The present disclosure is directed toward devices and methods for use in removing the foliage from stems of leafy vegetables and sprigs of herbs. The device has a body that is sized and shaped to fit comfortably into a one hand. The body can be generally flat and can have at least one edge following a convex curve. A trimming blade projects outwardly from at least a portion of the convexly curved edge of the body. A selection of apertures of different sizes extends through the body. The user can select an aperture large enough to allow the stem to pass through, but too small for the foliage to pass through. During use, a user can use the trimming blade to trim off unwanted parts from a sprig of herb or a piece of leafy vegetable, pass the sprig through a selected aperture sized to remove the foliage therefrom, and cut the foliage to the desired size by rocking the trimming blade along its length over the foliage.

BRIEF DESCRIPTION OF THE SEVERAL VIEWS OF THE DRAWING(S)

DETAILED DESCRIPTION

The present disclosure is directed toward devices and methods for use when preparing herbs and leafy vegetables. Specific embodiments are described below in association with the enclosed figures. A person of ordinary skill in the art, having reviewed this entire disclosure, will appreciate that some of the details shown and/or described can be changed or eliminated without deviating from the scope of the invention. As such, the scope of the invention should be construed based only on the claims.

FIGS. 1-7 collectively show all of the features of one embodiment of a tool 10 for use in preparing herbs and leafy vegetables for storing, cooking and eating. In particular, features of the tool 10 can be used to trim unwanted pieces and to strip the leafy portions from the stem. The tool 10 generally incorporates a body 12 having a trimming edge 14 and a plurality of apertures 16 for stripping foliage from stems.

Figure 1:
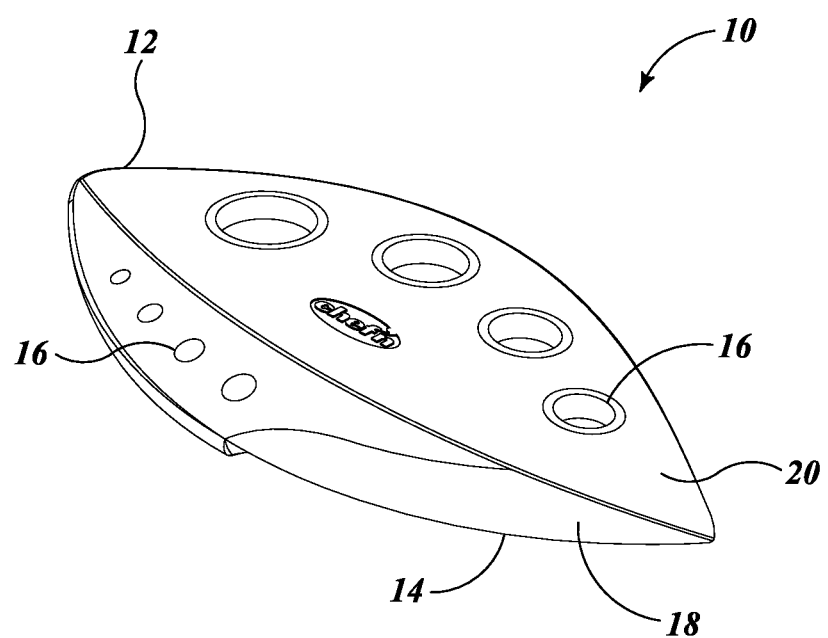
FIG. 1 is an isometric view of a device for use in preparing herbs and leafy vegetables.
Figure 2:
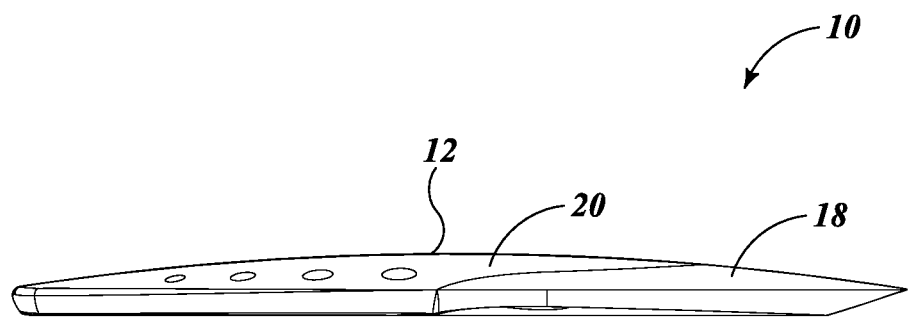
FIG. 2 is a front elevation view of the device of FIG. 1.
Figure 3:
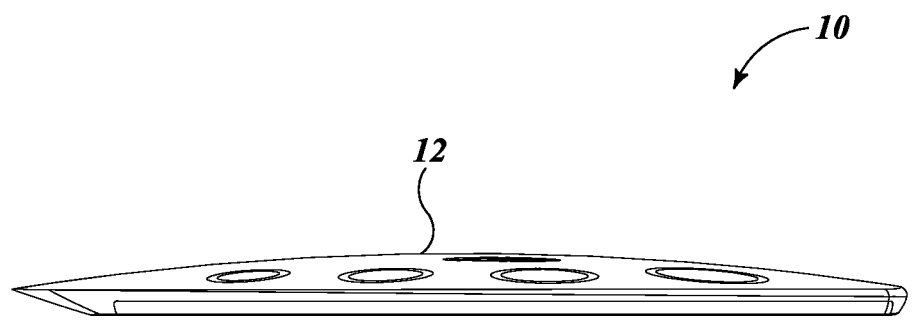
FIG. 3 is a rear elevation view of the device of FIG. 1.
Figure 4:
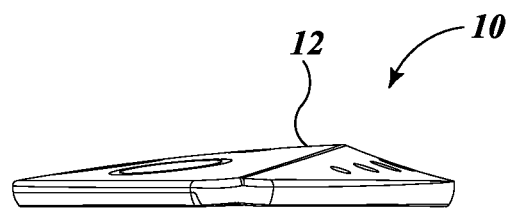
FIG. 4 is a left side elevation view of the device of FIG. 1.
Figure 5:
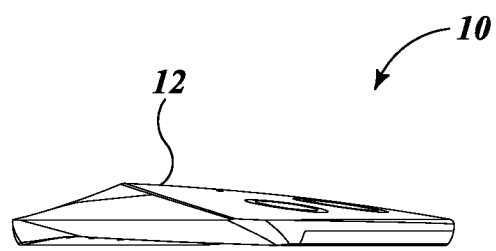
FIG. 5 is a right side elevation view of the device of FIG. 1.

As shown in FIG. 1, the illustrated body 12 is a single, unitary article having no moving parts. The embodiment selected to be illustrated incorporates a base portion 18 and an overmolded portion 20, collectively forming the unitary body 12. The base portion 18 and overmolded portion 20 can be selected based on their respective properties: hardness, color, resiliency, texture, workability, etc. In the illustrated embodiment, the base portion 18 is hardened and workable such that the trimming edge 14 can be sharpened and can maintain a sharp edge; and the overmolded portion 20 is resilient and has a tacky surface treatment to facilitate holding and retaining the tool 10 during use. Many other materials, combinations of materials, and respective features can be selected, as desired or appropriate for a particular use.

As shown in FIGS. 2-5, the body 12 can be thin to comfortably fit in a user's hand or between the user's fingers during the trimming and/or stripping process.

Figure 6:
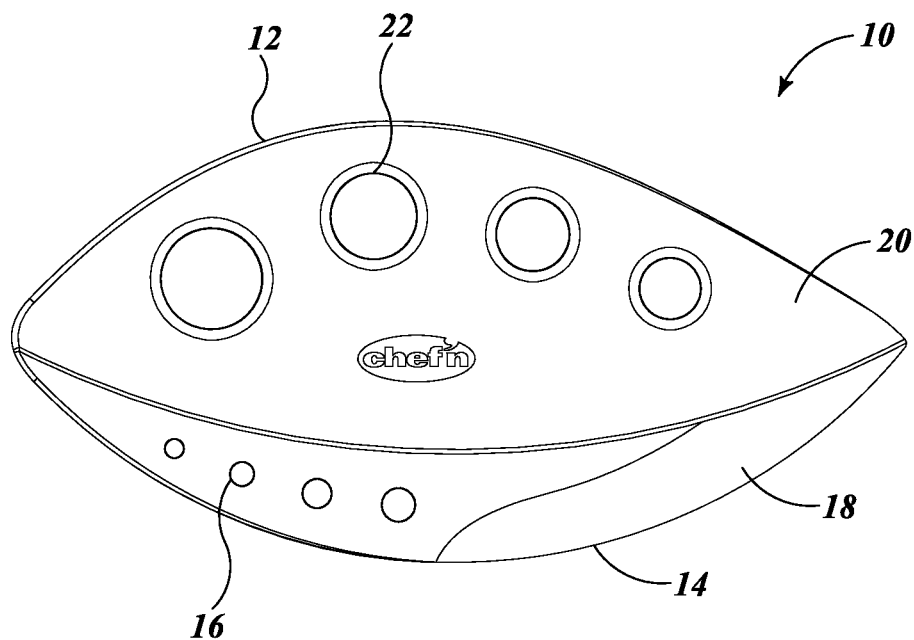
FIG. 6 is a top plan view of the device of FIG. 1.
Figure 7:
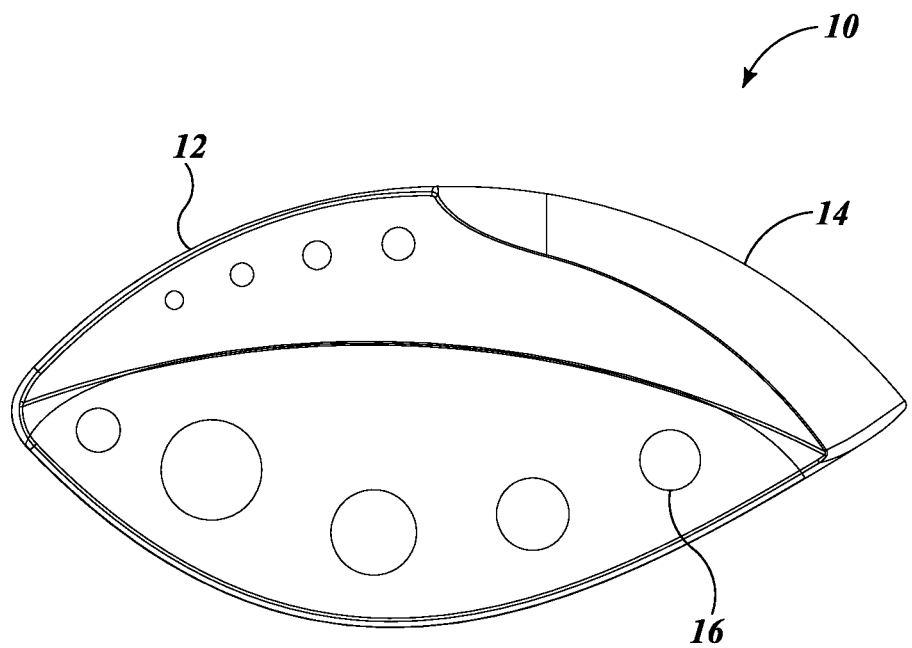
FIG. 7 is a bottom plan view of the device of FIG. 1.

As shown in FIGS. 6 and 7, the trimming edge 14 in the illustrated embodiment of the tool 10 extends roughly half the length of one side of the body 12. As a result, the trimming edge 14 can be used to trim food while the user holds the body 12 of the tool 10 in one hand. The illustrated trimming edge 14 has a convex profile, allowing it to be rolled over an article during cutting. Such a technique can be very effective in cutting or trimming herbs and leafy greens, which otherwise tend to move when cut with a reciprocating blade motion.

As also shown in FIGS. 6 and 7, the apertures 16 used to strip foliage from stems can be located throughout the body 12. In the illustrated embodiment, apertures 16 of many different sizes are positioned along all of the edges of the body 12 with the exception of the trimming edge 14. The illustrated tool 10 incorporates nine apertures 16, each aperture having a unique diameter. As a result, the tool 10 can be used to strip the foliage of a wide variety of herbs and leafy vegetables.

As best shown in FIG. 6, some of the apertures 16 can be part of the base portion 18 of the body 12, in which case, a ring 22 can project outward from the base portion 18 through the overmolded portion 20. In such embodiments, the overmolded portion 20 can be positioned outside the ring 22. This configuration may allow a ring 22 of harder material to be used on a side of the body 12 where the material otherwise is softer or more resilient. Using a harder material for the ring 22 may allow the aperture 16 to work more efficiently than if the aperture were made with the softer, more resilient material.

An individual of ordinary skill in the art, having reviewed this disclosure, will immediately appreciate that various changes could be made to the details described and shown in this disclosure without deviating from the spirit of the invention.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hand-operated device for use in removing foliage from a stem of a leafy vegetable or an herb, the device comprising:

a unitary, elongated body having no moving parts, the elongated body being sized to be held comfortably in a user's hand, the elongated body having opposing curved edges, at least a portion of each edge following a convex curve;

at least a portion of one of the convexly curved edges of the elongated body formed as a convexly curved sharp edge, the other of the convexly curved edges of the elongated body formed as a convexly curved dull edge opposite the sharp edge;

a plurality of apertures of different sizes extending through the body, the apertures being spaced apart from each other along the opposing curved edges, such that a user can select an aperture large enough to allow the stem of a selected leafy vegetable or herb to pass through the aperture but too small for the foliage of the leafy vegetable or the herb to pass through, and whereby a user can pass the selected leafy vegetable or the herb through the selected aperture to remove the foliage therefrom, and then cut the foliage to a desired size by holding the body with the convexly curved dull edge against the user's hand and rocking the convexly curved sharp edge along its length over the foliage.

2. The hand-operated device of claim 1 wherein the elongated body is slightly thicker in a middle portion than it is along the convexly curved edges.

3. The hand-operated device of claim 1 wherein a thickness of the elongated body tapers downward as it approaches the convexly curved edges of the body.

4. The hand-operated device of claim 1 wherein the apertures are circular.

5. The hand-operated device of claim 1 wherein the apertures are circular and have different diameters.

* * * * *